US006619770B1

(12) United States Patent
Drab et al.

(10) Patent No.: US 6,619,770 B1
(45) Date of Patent: Sep. 16, 2003

(54) SECURITY DRAWER FOR SERVICE CART

(76) Inventors: Robert F. Drab, 400 S. Steele St. #65 Hyde Park, Denver, CO (US) 80111; Anthony J. Selway, 824 S. Sherman, Denver, CO (US) 80209; Sylvian Savard, 284 Normandie, Rosemere, Quebec (CA), J7A 1T5; Martin Gagnier, 176 Hotel de Ville, Apt. #1, Vandreuil-Dorion, Quebec (CA), J7V 1N8; Raymond Fallis, 271 Champlain, Pointe-Claire, Quebec (CA), H9R 5X7

( * ) Notice: Subject to any disclaimer, the term of this patent is extended or adjusted under 35 U.S.C. 154(b) by 365 days.

(21) Appl. No.: 09/652,086

(22) Filed: Aug. 31, 2000

(51) Int. Cl.[7] .............................................. A47B 88/00
(52) U.S. Cl. .................................... 312/333; 312/330.1
(58) Field of Search .............................. 312/333, 330.1, 312/334.1, 334.7, 334.27, 348.3, 215, 222, 107.5; 70/85, 86

(56) References Cited

U.S. PATENT DOCUMENTS

| 4,030,788 | A | * | 6/1977 | Bleeker ....................... 312/333 |
| 4,401,350 | A | * | 8/1983 | Fortune .................. 312/333 X |
| 5,129,501 | A | * | 7/1992 | Halsey et al. ........... 312/333 X |
| 5,549,375 | A | * | 8/1996 | Pagliaccio ........... 312/330.1 X |
| 5,716,114 | A | * | 2/1998 | Holmes et al. ......... 312/333 X |
| 5,758,525 | A | * | 6/1998 | Goldman ..................... 70/353 |
| 5,805,075 | A | * | 9/1998 | Carlson et al. ............. 312/215 |
| 6,003,008 | A | * | 12/1999 | Postrel et al. ........... 235/381 X |

FOREIGN PATENT DOCUMENTS

| DE | 931462 | * | 8/1955 | ................. 312/333 |
| FR | 1144697 | * | 10/1957 | ................. 312/333 |

* cited by examiner

Primary Examiner—James O. Hansen
(74) Attorney, Agent, or Firm—Townsend and Townsend and Crew LLP

(57) ABSTRACT

A security drawer assembly is provided for a standard airline service cart having opposite cart sidewalls defining a storage space therebetween and a plurality of horizontal runners mounted on the sidewalls inside the storage space. The security drawer assembly generally comprises a sleeve and drawer slidably mounted within the sleeve. The sleeve has opposing sidewalls defining a sleeve passage open at both ends. Each of the sleeve sidewalls include a horizontal flange for engaging the runners of the service cart. The sleeve is retained within the cart by stop blocks connected to the sleeve sidewalls which engage the ends of the cart runners. The stop blocks are connected to the sleeve by fasteners which are not accessible for removal when the drawer is closed and locked. The drawer is preferably constructed so as to be slidable in either direction such that it has a closed position and two open positions, one corresponding to each of the two open sleeve ends. The drawer is divided into two compartments, only one of which is accessible in each of the open positions. Each end of the drawer is equipped with a handle and a lock mechanism for controlling access to the respective drawer compartment.

19 Claims, 13 Drawing Sheets

SECURITY DRAWER FOR SERVICE CART

BACKGROUND OF THE INVENTION

1. Field of the Invention

The present invention relates generally to the field of secure receptacles, and in particular to a security drawer for mounting in an airliner service cart for in-flight currency exchange and merchandise sales.

2. Description of the Prior Art

The field of secure storage has produced a wide variety of receptacles and containers designed to accommodate various objects. The sizes and shapes of the contents are significant design factors. Security factors and access control are also important considerations. Banks and other financial institutions store cash and valuables in various ways, including cash drawers, safe deposit boxes, vaults, etc.

Activities which involve currency tend to have relatively high security requirements. Bank notes tend to be relatively small and are easily concealed. Systems for handling same thus include procedures for maintaining accountability and for reconciling transactions with currency balances. For example, retail establishments tend to rely on cash registers and similar equipment. Access to the cash contained therein is typically controlled with locking cash drawers to which only designated individuals have keys.

Airlines and other public transportation providers commonly provide limited retail operations in flight and in route. For example, beverages and merchandise are often sold by the flight crews to commercial airline passengers. On international flights, duty-free sales are common. Airline space and weight restrictions tend to severely limit the sizes and quantities of goods in inventory. Airlines typically retain percentages of merchandise sales by their flight crews. Therefore, in order to maximize revenue and comply with tight space limitations, on-board inventories commonly consist of relatively expensive, small-size merchandise.

A common procedure for conducting in-flight sales involves stocking one or more airline service carts with merchandise. The carts are stowed in the airliners' galleys along with the other service carts provided by the food and beverage service caterers. The flight attendants navigate the aisles of the cabin while selling the contents of the service cart. Merchandise sales procedures are thus similar to procedures for serving and selling food and beverages in flight.

A number of problems are commonly encountered with in-flight currency handling. For example, a certain amount of cash is generally required in inventory in order to provide change to the passengers. Moreover, the cash receipts must be accounted for at the conclusion of the flight. Problems can arise when multiple aircrews work different legs using the same aircraft and service carts. For example, cash handling safeguards and security are necessary to minimize the risk of loss of currency and/or merchandise.

Problems relating to handling foreign currency arise on international flights. International travelers typically require currency for their destinations. Various financial institutions, such as banks, provide currency exchange services. However, locating such institutions can be difficult for international travelers.

The prior art includes a point-of-sale device disclosed in U.S. Pat. No. 6,003,008, which is assigned to a common assignee herewith. The device disclosed therein mounts on top of a service cart for operation by the flight crew. Both currency exchange and merchandise sales transactions can be handled. However, the device is too large for general use by the airlines.

In addition to the size limitations mentioned above, equipment used on airlines is subject to regulation by applicable governmental agencies. In the United States, the Federal Aviation Administration (FAA) has jurisdiction over aircraft and equipment utilized thereon. Thus, the service carts used by airlines operating in the United States have received FAA approval based on meeting certain size, weight and other criteria.

Airlines are reluctant to modify FAA-approved equipment because the modifications may lead to additional rounds of approval procedures. Therefore, important objectives in designing equipment for handling in-flight currency exchange and merchandise sales include security, accountability by all flight crew members operating same, compact size and capability of mounting within existing, FAA-approved equipment without modifying same. Heretofore, there has not been available a security drawer for service carts with the advantages and features of the present invention.

SUMMARY OF THE INVENTION

In the practice of the present invention, a security drawer assembly is provided for a standard airline service cart. Such service carts generally include opposite sidewalls which define a storage compartment therebetween. Each sidewall has a plurality of horizontal runners mounted thereon for supporting food trays and the like. The front and back of the service cart have doors which swing open to provide access to the storage compartment.

The security drawer assembly generally includes a sleeve and a drawer slidably mounted in the sleeve. The sleeve has opposite first and second sleeve sidewalls, opposite first and second open ends, and a passage extending between the open ends. A flange mounted to each of the sleeve sidewalls is adapted for slidably engaging a respective cart runner such that the sleeve is horizontally slidably supportable in the storage compartment by the flanges engaging the respective cart runners. The sleeve is retained within the cart by stop blocks connected to the sleeve sidewalls proximate the sleeve ends which engage the ends of the cart runners. The stop blocks are connected to the sleeve by fasteners which are not accessible for removal when the drawer is closed and locked.

The drawer has opposite first and second sidewalls, opposite first and second ends, and is slidably received in the sleeve passage such that it is movable between a first open position where the drawer first end extends from the sleeve first end, a second open position where the drawer second end extends from the sleeve second end, and a closed position where the drawer is contained within the sleeve. The drawer also includes a dividing wall located intermediate the first and second ends which divides the drawer into first and second compartments. Only the first compartment is accessible when the drawer is in the first open position and only the second compartment is accessible when the drawer is in the second open position.

The first and second drawer compartments have respective first and second lock mechanisms installed therein which control access to the respective drawer compartments. The first lock mechanism includes a first deadbolt which is selectively extendable through the first drawer sidewall and the second lock mechanism includes a second deadbolt which is selectively extendable through the second drawer sidewall.

The sleeve is provided with drawer stops positioned to engage the deadbolts of the drawer lock mechanisms. The first and second sleeve sidewalls have respective first and second drawer stops mounted to them intermediate the first and second sleeve ends, and each of the stop blocks includes an inner portion which extends into the sleeve passage and also serves as a drawer stop.

When both of the lock mechanisms have their deadbolts extended, the drawer is retained in its closed position, since the first deadbolt engages the stop block mounted on the first sleeve sidewall proximate the first sleeve end and the second deadbolt engages the stop block mounted on the second sleeve sidewall proximate the second sleeve end. When only the first lock mechanism has its deadbolt extended the drawer is moveable to the second open position, the first deadbolt being free to move between the stop block mounted on the first sleeve sidewall proximate the first sleeve end and the first drawer stop. Similarly, when only the second lock mechanism has its deadbolt extended, the drawer is moveable to the first open position, since the second deadbolt is moveable between the stop block mounted on the second sleeve sidewall proximate the second sleeve end and the second drawer stop.

Since the primary purpose of the security drawer is the storage of currency, each compartment of the security drawer may include a plurality of bill dividers for sorting cash and a plurality of change cups for sorting change, as well as a security box, the security box having a hinged lid with a hasp for receiving a flexible security seal.

OBJECTS AND ADVANTAGES OF THE INVENTION

The principal objects and advantages of the present invention include: providing a security drawer assembly for an airline service cart; providing such a security drawer which can be installed in the service cart without making any modifications to the cart; providing such a security drawer assembly which cannot be removed from the cart when the drawer is locked; providing such a security drawer assembly which affords superior protection to valuable contents stored therein; providing such a security drawer assembly which is compact and fits entirely within the service cart; providing such a security drawer assembly which has separate compartments with access to each compartment controlled by separate locks; and providing such a security drawer assembly which is economical to manufacture, efficient in operation, capable of a long operating life and particularly well-adapted for the proposed usage thereof.

DETAILED DESCRIPTION OF THE PREFERRED EMBODIMENTS

I. Introduction and Environment

Figure 1:
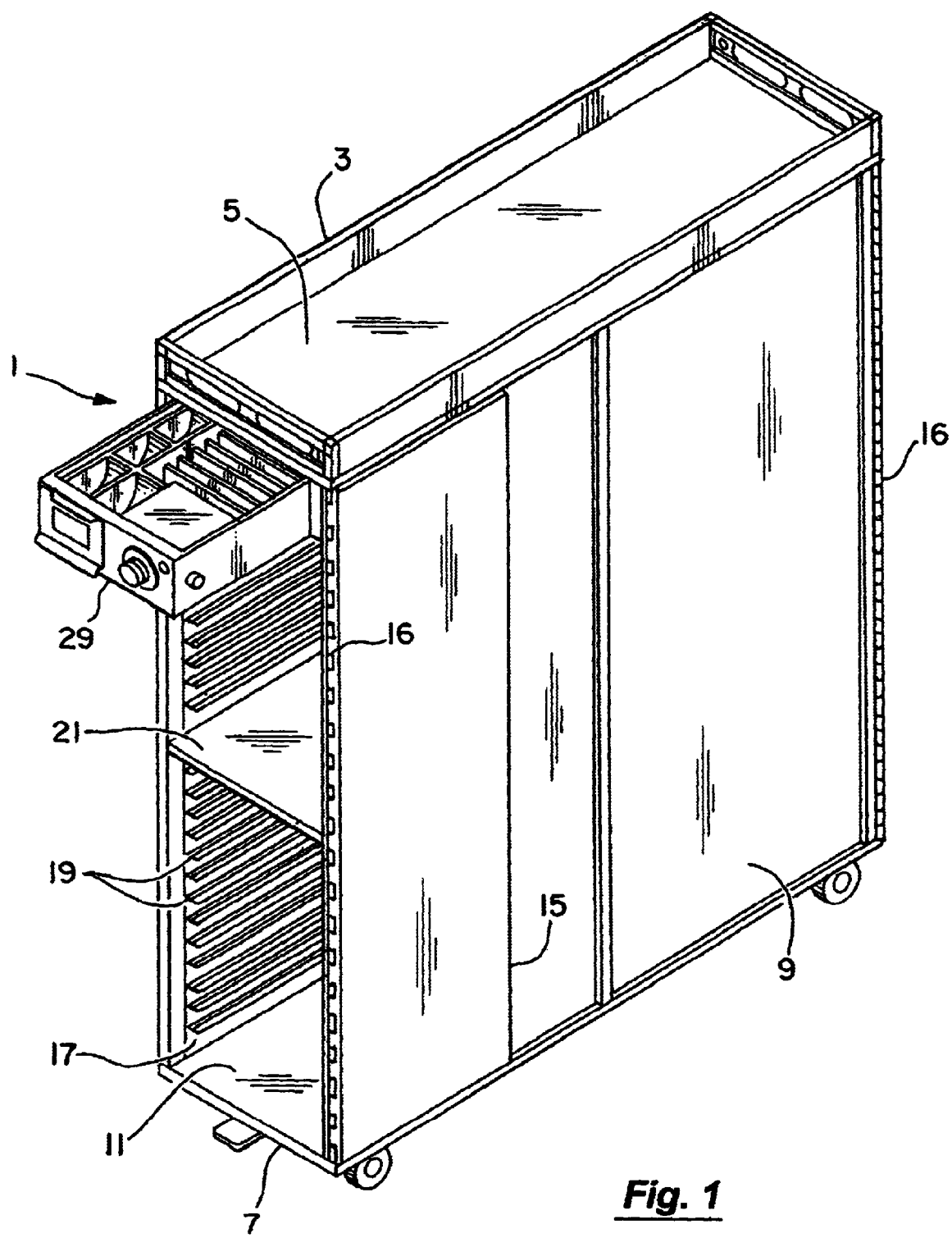
FIG. 1 is a perspective view of a full-sized service cart including a security drawer assembly embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

II Security Drawer Assembly 1

Referring to the drawings in more detail, the reference numeral 1 generally designates a service cart security drawer assembly embodying the present invention. The drawer assembly 1 is designed for use with a standard full-sized airline service cart 3 (FIG. 1) having a top wall 5, a bottom wall 7, opposing sidewalls 9, and open ends 11, 13. The open ends 11, 13 are selectively covered by doors 15 which are connected to the cart 3 by hinges 16. Each of the sidewalls 9 has an inner surface 17 equipped with a plurality of vertically spaced rails or runners 19 designed for slidably accepting food trays and other containers. The service cart 3 may further include a stationary center shelf 21.

Figure 2:
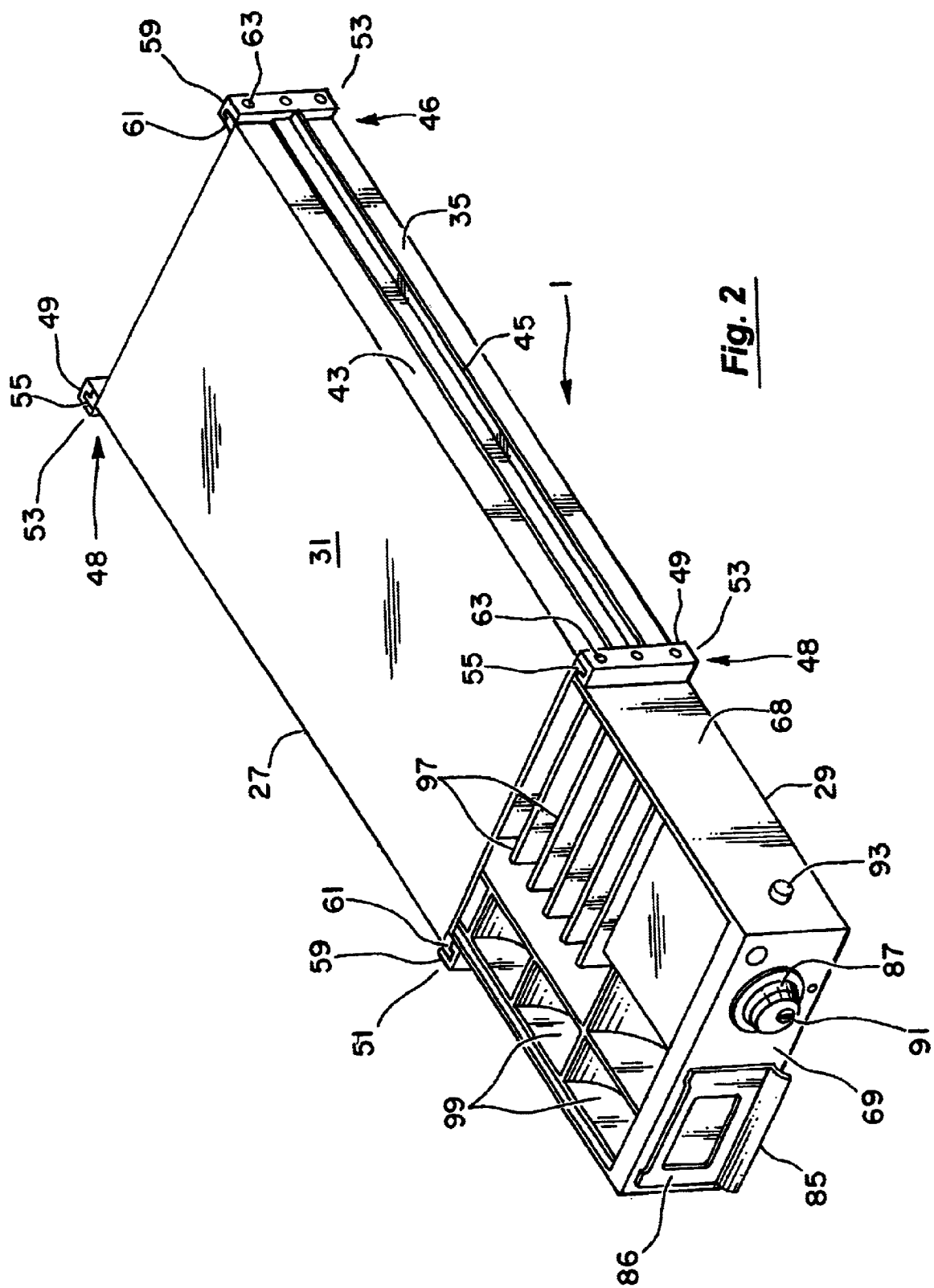
FIG. 2 is a perspective view of the security drawer assembly.
Figure 3:
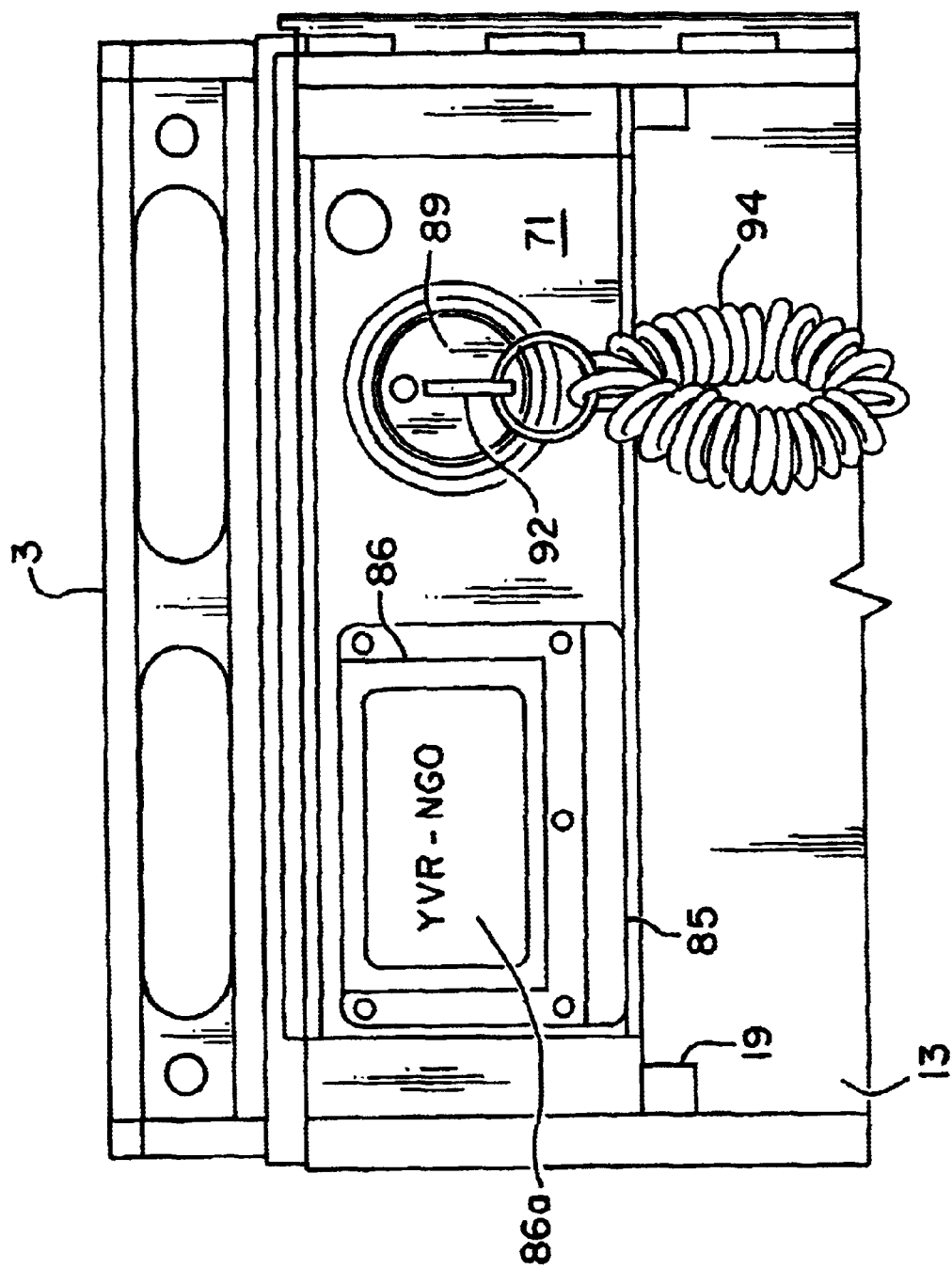
FIG. 3 is a partial end view of the service cart.
Figure 4:
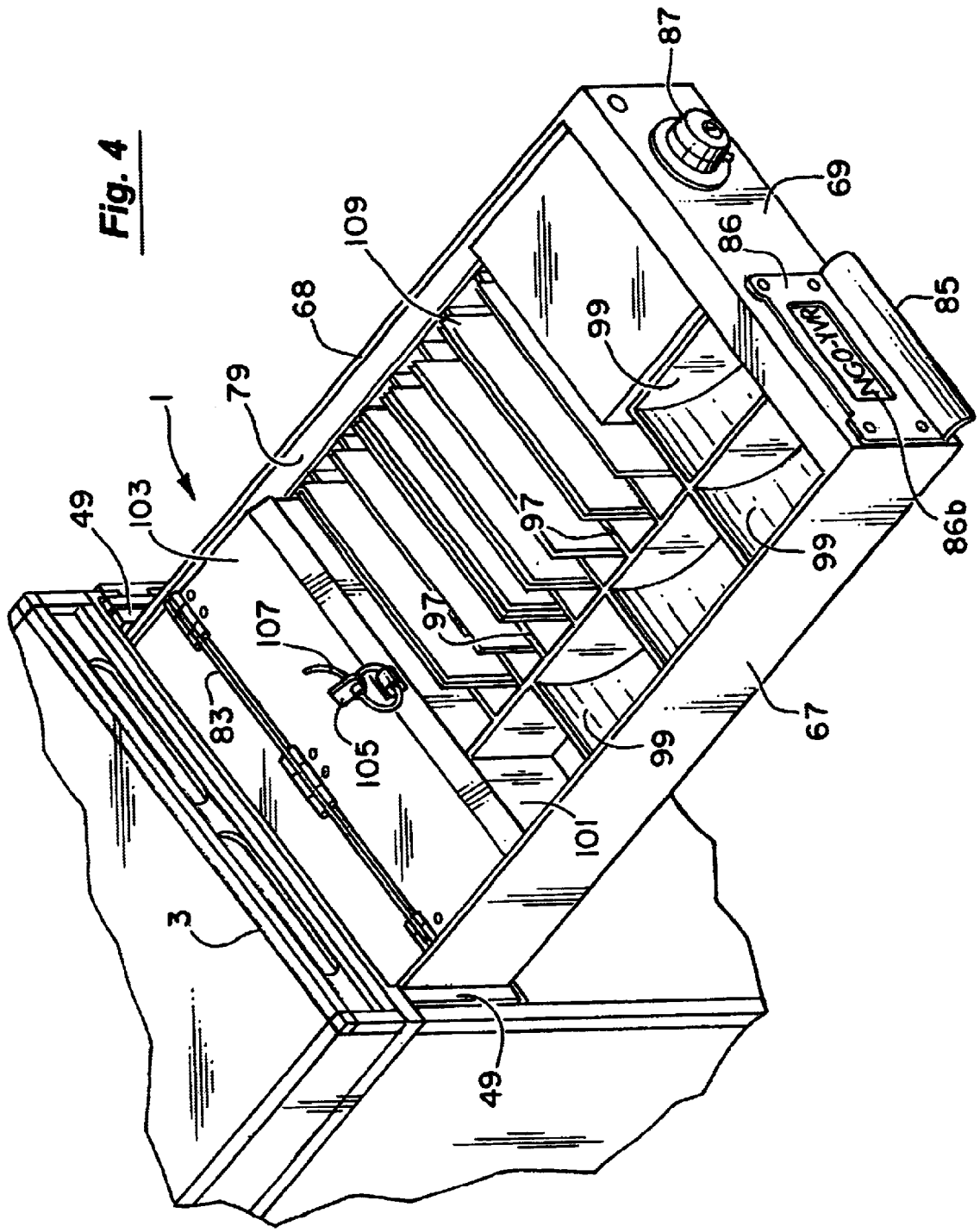
FIG. 4 is a partial perspective view of the service cart with the security drawer in the open position.
Figure 5:
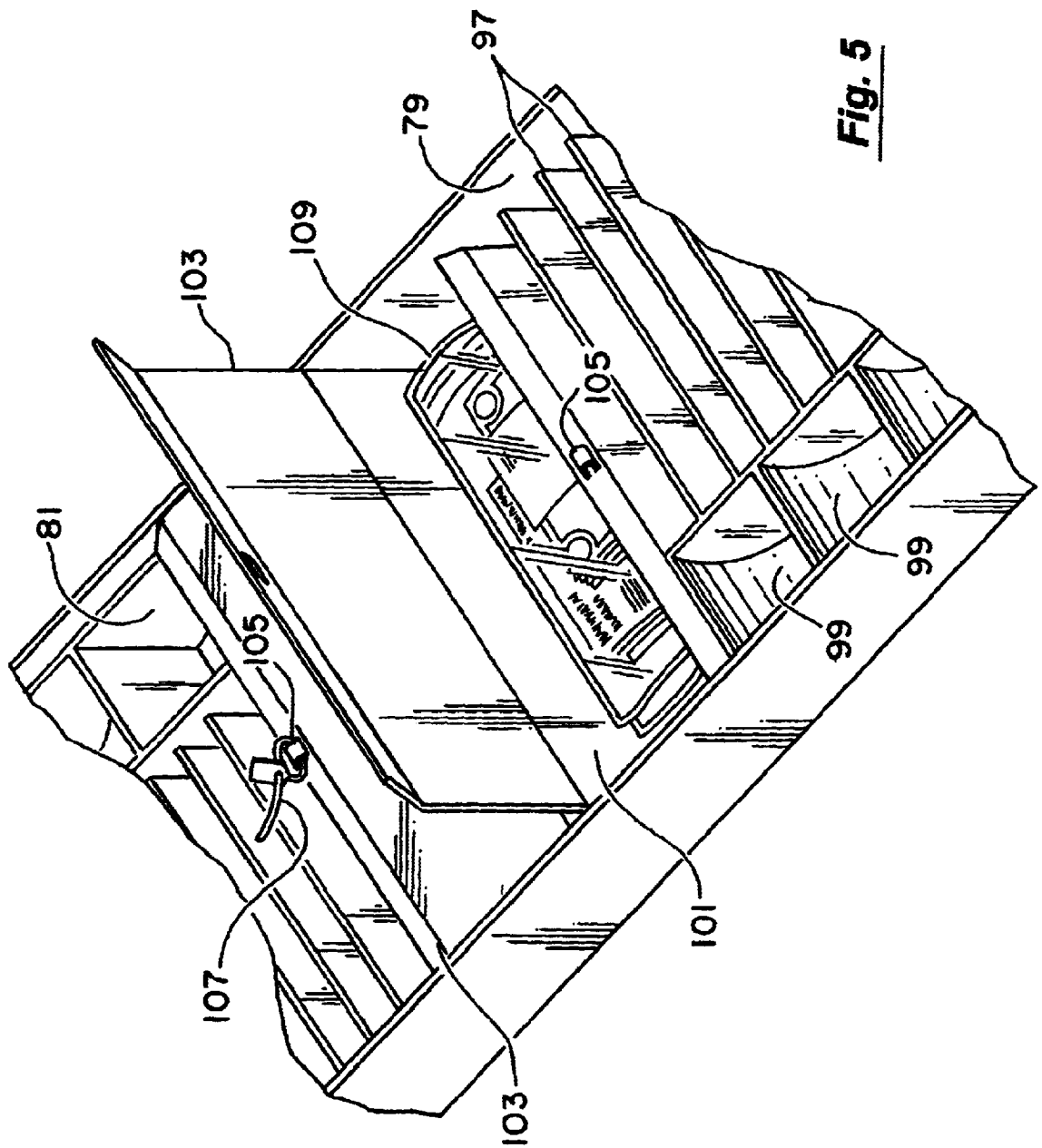
FIG. 5 is a partial perspective view of the security drawer.
Figure 7:
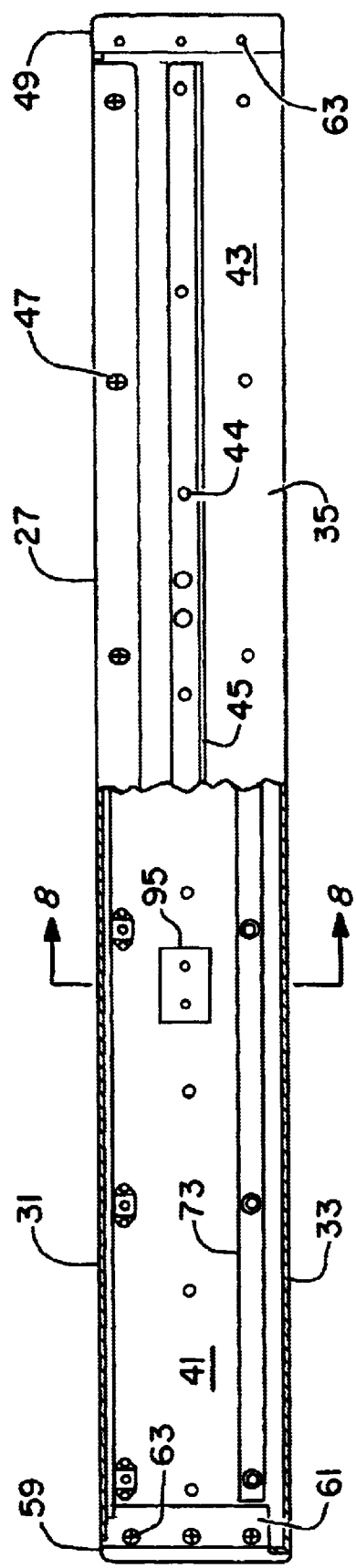
FIG. 7 is a side view of the security drawer sleeve with a cross-section taken along line 7—7 in FIG. 6.
Figure 8:
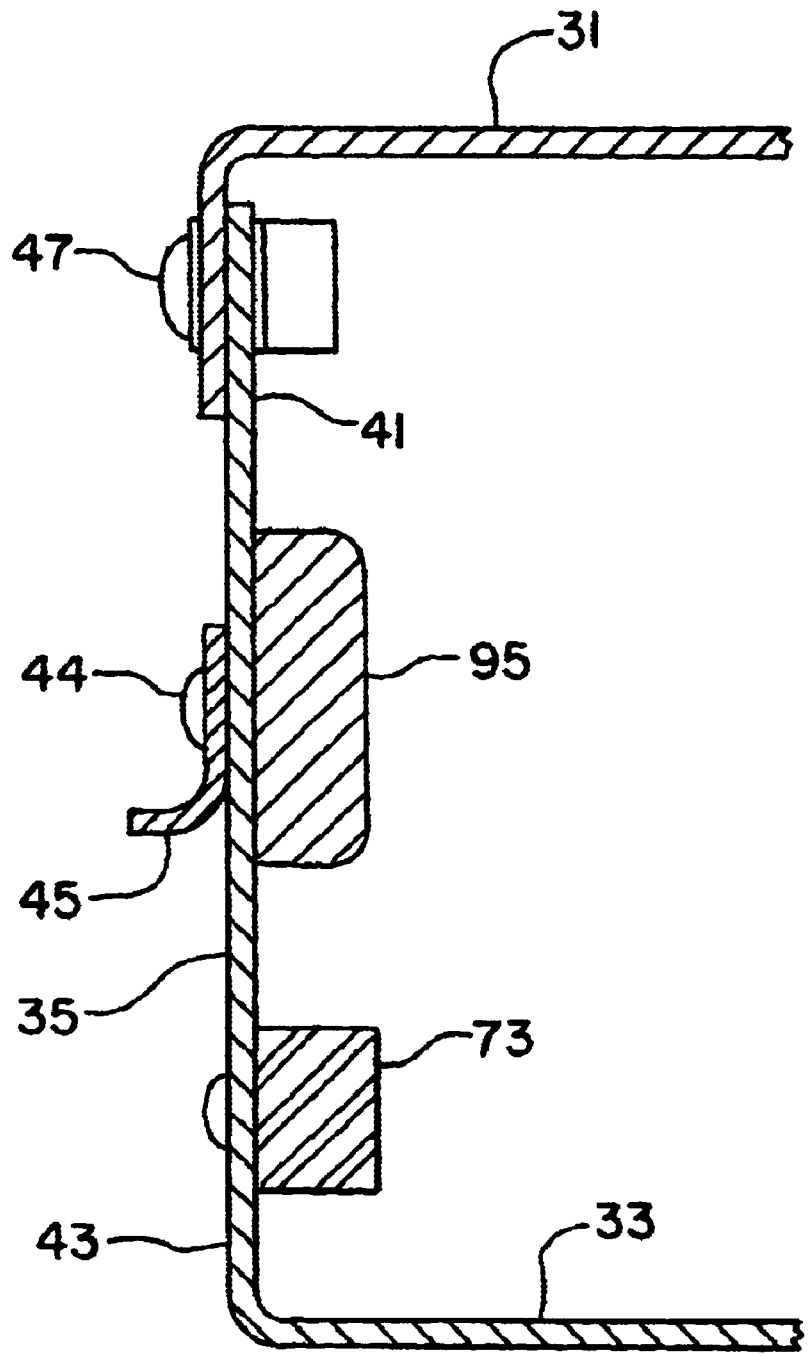
FIG. 8 is a cross-sectional view of the sleeve taken along line 8—8 in FIG. 7.
Figure 9:
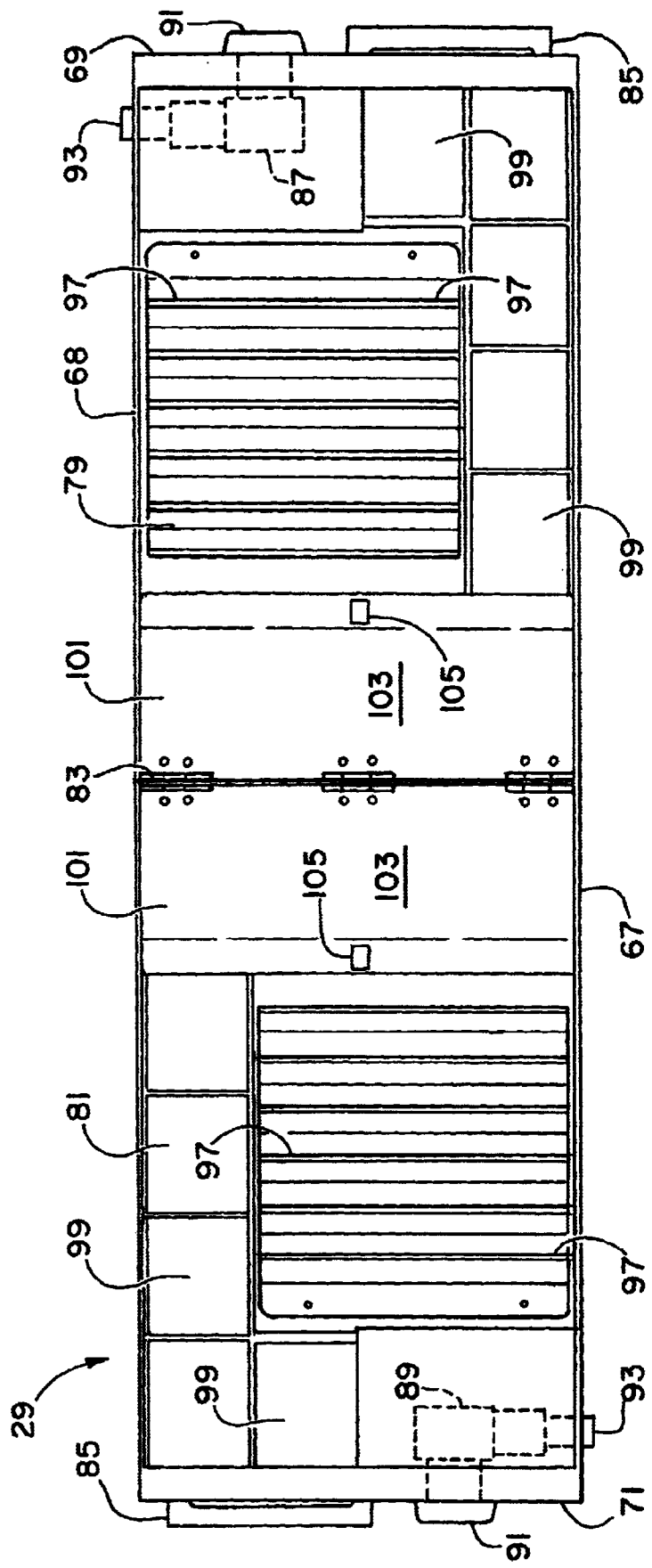
FIG. 9 is a top view of the security drawer.
Figure 10:
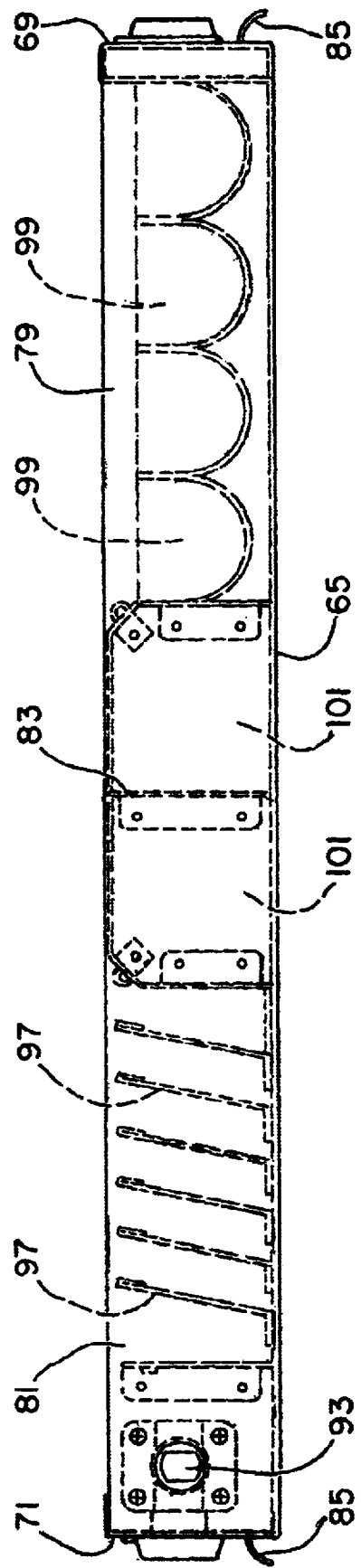
FIG. 10 is a side view of the security drawer.
Figure 11:
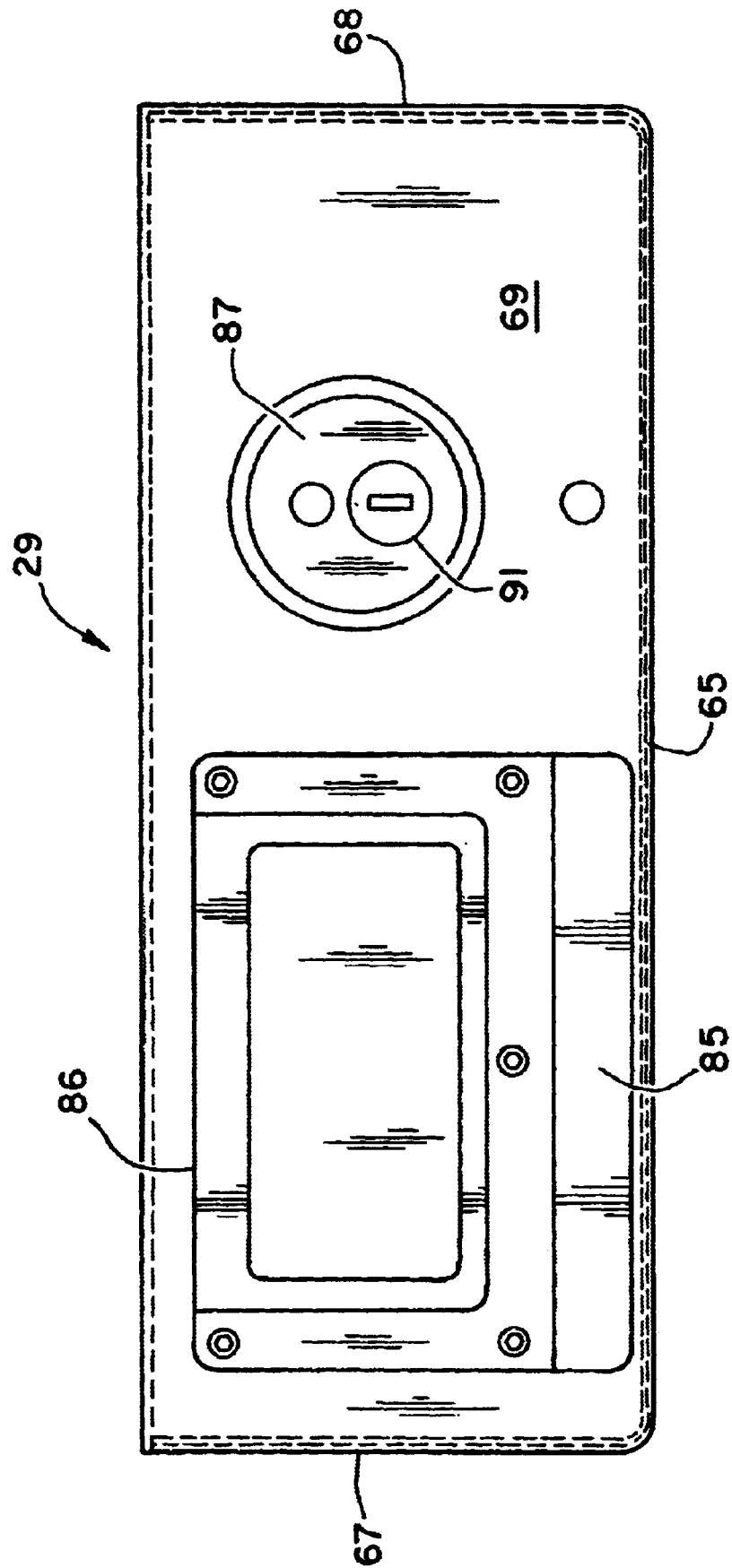
FIG. 11 is an end view of the security drawer.

The security drawer assembly 1 (FIG. 2) generally comprises a rectangular sleeve 27 which is securable to the cart 3 between the sidewalls 9, and a drawer 29 which is slidably received within the sleeve 27. The sleeve 27 has a top wall 31, a bottom wall 33, and opposing sidewalls 35 which define a sleeve passage 36 with open ends 37, 39. Each of the sleeve sidewalls 35 has in inner surface 41 and an outer surface 43. As seen in FIGS. 7 and 8, the sleeve 27 may be formed of a single piece of sheet metal which is bent to the proper shape and assembled with rivets or screws 44.

Referring again to FIG. 2, the sleeve 27 is mountable to the cart 3 by a sleeve mounting mechanism 46 which includes a pair of horizontal flanges or rails 45, one of which is secured to each sidewall outer surface 43 such that it extends outwardly therefrom, the flanges 45 serving to slidably engage an opposing pair of the runners 19 of the service cart sidewalls 9. The flanges 45 may be formed of steel stock having an L-shaped cross-section, and may be secured to the sleeve sidewalls 35 by rivets 47.

An important feature of the security drawer assembly 1 is that the sleeve 27 is securable to the cart 3 in such a manner that the assembly 1 cannot be removed from the cart 3 when the drawer 29 is closed and locked. It is also important that the assembly 1 be secured to the cart 3 without the necessity of making any modifications to the cart 3. In order to satisfy these requirements, the sleeve mounting mechanism 46 further includes a sleeve retaining mechanism 48 which comprises four stop blocks 49 which are secured to the sleeve sidewalls 35 at their outboard ends 51, 53, proximate the sleeve passage ends 37, 39, respectively. With the stop blocks 49 in place, the sleeve 29 cannot be removed from the cart 3 by sliding the sleeve 29 in either direction because the stop blocks 49 engage the distal ends of the runners 19 of the cart sidewalls 9, preventing further movement of the sleeve 29.

Figure 6:
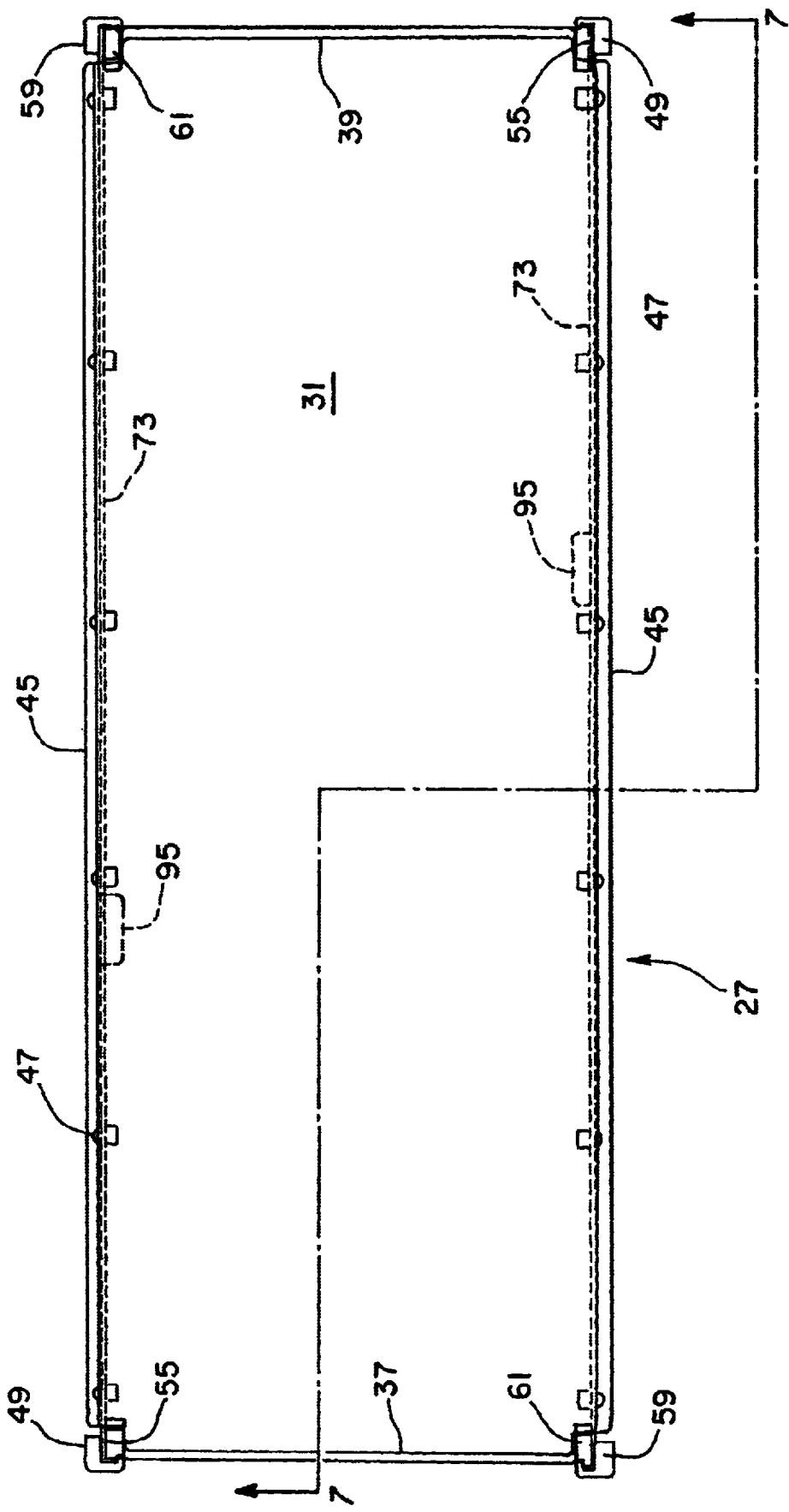
FIG. 6 is a top view of the sleeve for the security drawer.

Looking at the stop blocks 49 in more detail (FIGS. 2 and 6), each sleeve sidewall outboard end 51, 53 extends outwardly past the past the edges of the top wall 31 and the bottom wall 33 to form a mounting flange 55. The stop blocks 49 each comprise an outer section 59 and an inner section or doubler 61. The outer section 59 has a generally J-shaped cross-section and is sized and shaped to attach to the outside of the respective sidewall outboard end 51, 53 and encompass the respective mounting flange 55. The inner section 61 fits inside the respective flange 55 and has a generally rectangular cross-section but for a notch sized and shaped to mate with the outer section 59. The inner block portion 61 is of a sufficient thickness that also serves as a stop for the drawer 29, as will be described later.

A plurality of fasteners, such as flat head machine screws 63 are installed through aligned receivers in the inner block section 61, outer block section 59, and mounting flange 55 with the heads of the screws 63 being positioned inside the sleeve 27 and received by countersinks in the inner block section 61. The receivers in the outer block section 59 are internally threaded so that no nuts are used in the installation. With the screws 63 installed in this manner, the heads are not accessible when the drawer 29 is closed and locked, and therefore cannot be removed.

The drawer 29 generally comprises a rectangular box structure having a bottom wall 65, opposing sidewalls 67, 68 and opposing end walls 69, 71. The drawer 29 is sized and shaped to be slidably received within the sleeve 27, and is supported by drawer slides 73 secured to the inner surfaces 41 of the sleeve sidewalls 35.

The drawer 29 (FIGS. 4 and 9–11) is preferably constructed so that it may be pulled out from the sleeve 27 in two different directions, i.e. the drawer end 69 may be pulled outward from the sleeve end 37, or the drawer end 71 may be pulled outward from the sleeve end 39. However, while the drawer assembly 1 will be described herein as having a drawer 29 which is bi-directional or slidable in two directions, it is foreseen that other embodiments of the present invention may be constructed having a sleeve 27 with one closed end and a drawer 29 which is slidable in only a single direction.

The bi-directional drawer 29 is divided into two compartments 79, 81 by a dividing wall 83 located midway between the drawer end walls 69, 71. Each of the end walls 69, 71 is equipped with a handle 85 for grasping and pulling the drawer 29 outward from the sleeve 27. The handles 85 may be equipped with card holders 86, which may be used for inserting either an outbound label 86a identifying the contents of the compartment 79, 81 as being for use on the outbound flight or an inbound label 86b identifying the contents of the compartment 79, 81 as being for use on the inbound flight.

Each compartment 79, 81 has a respective lock mechanism 87, 89 for locking the drawer, the lock mechanism 87 being installed proximate the intersection of the drawer end wall 69 and the sidewall 68 and the lock mechanism 89 being installed proximate the intersection of the drawer end wall 71 and the sidewall 67 . The lock mechanisms 87, 89 each having a lock cylinder 91 which extends through the respective drawer end wall 69, 71 into which respective keys 92 are inserted for locking and unlocking the drawer 29. The lock mechanisms 87, 89 are not keyed alike, therefore the key 92 for lock mechanism 87 will not open lock 89, and vice versa. The keys 92 may be identified by use of color coded wrist straps 94. Each lock mechanism 87, 89 is equipped with a deadbolt 93 which selectively extends outward from a respective one of the drawer sidewalls 67, 68 in response to the insertion of the respective key 92. A suitable lock mechanism is produced by Ilco Unican, Inc. of Montreal, Canada. This lock mechanism is disclosed and described by U.S. Pat. No. 5,758,525, entitled High Security Key Operated Lock, and that patent is incorporated herein by reference.

Each sleeve sidewall 35 has a drawer stop 95 (see FIGS. 6 and 7) connected to its inner surface 41 intermediate its outboard ends 51, 53, and positioned to engage the respective lock deadbolt 93. The described arrangement of the lock mechanisms 87, 89, stop block inner portions 61 and drawer stops 95 allows the drawer 29 to be either fully locked so that neither the compartment. 79 nor the compartment 81 can be opened, or partially locked so that only one of the compartments 79 or 81 may be accessed. If both of the lock mechanisms 87, 89 have their respective deadbolts 93 extended, then the drawer 29 cannot be opened by moving it in either direction, as the deadbolts 93 will engage the respective stop block inner portions 61 and prevent such movement. If only the lock mechanism 87 has its deadbolt 93 extended, then the drawer 29 may be opened to expose the compartment 81 by pulling the drawer end wall 71 in the direction of sleeve end 39. The drawer 29 cannot be opened so far as to expose any portion of compartment 79 because the deadbolt 93 of lock mechanism 87 will engage the respective drawer stop 95 and stop movement of the drawer 29 in this direction. Conversely, if only the lock mechanism 89 has its deadbolt 93 extended, then the drawer 29 may be opened to expose the compartment 79 by pulling the drawer end wall 69 in the direction of sleeve end 37. The drawer 29 cannot be opened so far as to expose any portion of compartment 81 because the deadbolt 93 of lock mechanism 89 will engage the respective drawer stop 95 and stop movement of the drawer 29 in this direction.

Having a drawer 29 which opens in two directions to expose two different compartments 79, 81, with access to the compartments 79, 81 controlled by two different locks 87, 89 with different keys 92 allows the same drawer 29 to be used by two different groups of personnel, for example the flight crews of outbound and return flights, without the groups having access to each other's drawer compartment. This provides for an extra level of security, as each crew is responsible for accounting for the contents of their individual drawer compartment 79, 81 and cannot lay blame for any shortfall on the other crew.

As the primary purpose of the security drawer assembly 1 is as a storage compartment for currency of varying denominations and perhaps for the currencies of several countries, the interior of the compartments 79, 81 may be equipped with a plurality of bill dividers 97 and change cups 99. Each compartment 79, 81 may also include a sealable security box 101 having a hinged lid 103. The security box 101 preferably has a hasp 105 for the insertion of a flexible security seal 107. At the beginning of a flight, a quantity of cash 109 may be sealed in the security box 101. The flight crew may then break the seal 107 and use the cash as change for purchases made in-flight or in currency exchanges. At the end of the flight the remaining currency is then counted and placed in the security box 101, which is then resealed with a new security seal 107.

III. Alternative Embodiment 201

Figure 12:
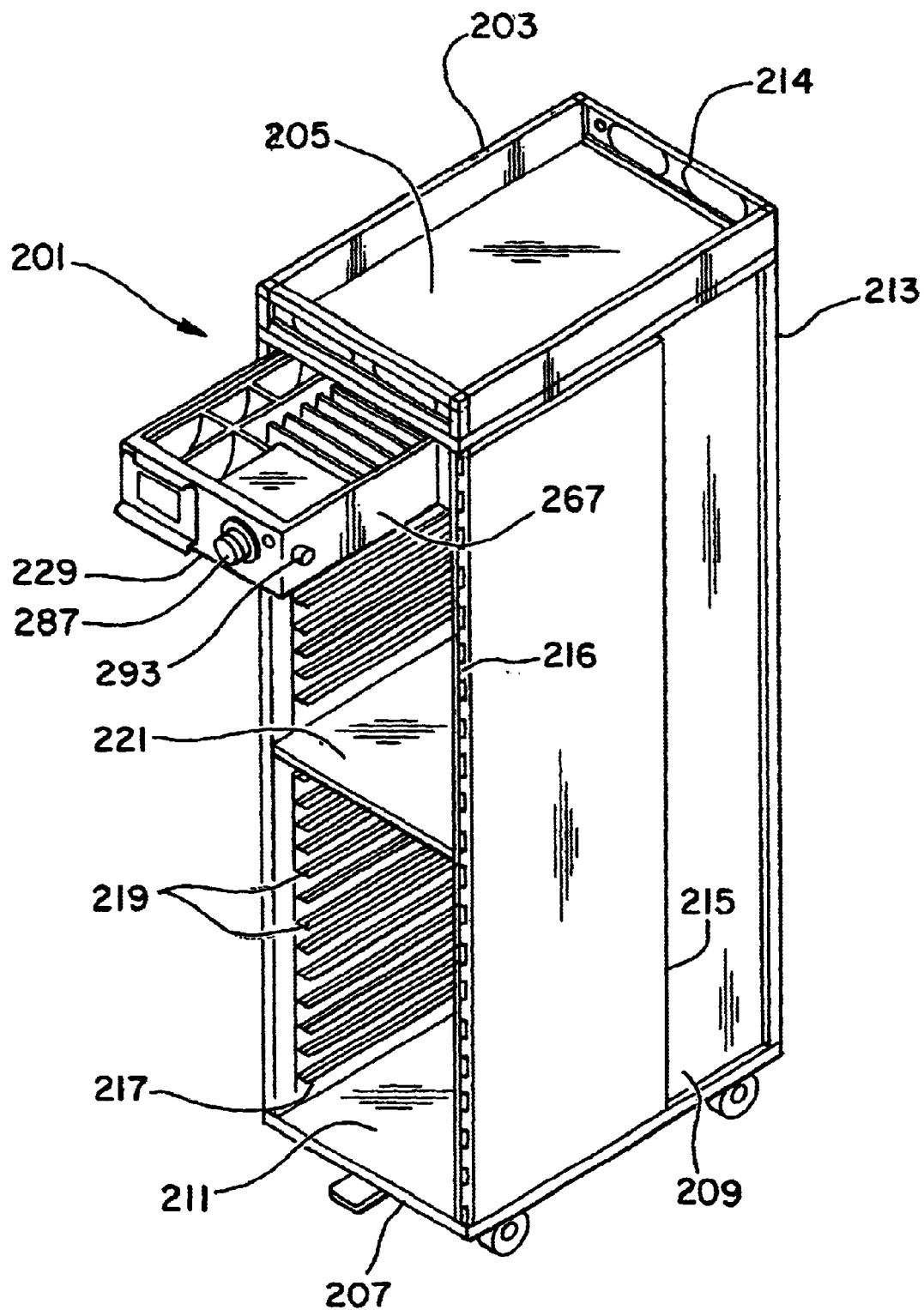
FIG. 12 is a perspective view of a half-sized service cart including a security drawer assembly embodying the present invention.

As an alternative to the full-sized service cart 3, some airlines employ a half-sized service cart 203 (see FIG. 12), which is similar to the standard full-sized service cart 3 in that it has a top wall 205, a bottom wall 207, and opposing cart sidewalls 209 having inner surfaces 217 which each support a plurality of horizontal runners 219. The cart 203 may also include a center shelf 221. The half-sized cart 203, however has an open front end 211 selectively covered by a door 215 which is connected to the cart 203 by a hinge 216. The back end 213 of the cart 203 is fully enclosed by a back wall 214. An alternative security drawer assembly 201 is required in order to accommodate those airlines which use the half-sized service cart 203.

As with the security drawer assembly 1, the alternative security drawer assembly 201 generally comprises a sleeve 227 and a drawer 229 which is slidably received within the sleeve 227. The sleeve 227 has opposing sidewalls 235 which each have an inner surface 241, an outer surface 243, a front end 251 and a back end 253. The sleeve 227 is supported within the cart 203 by a sleeve mounting mechanism 246 which includes horizontal flanges 245 mounted on the outer surfaces 243 of the sidewalls 235 which are slidably engagable with a respective pair of the cart sidewall runners 219. The sleeve mounting mechanism 246 also includes a sleeve retaining mechanism 248, but because the back end 213 of the cart 203 is enclosed, the sleeve retaining mechanism 248 is somewhat different from the sleeve retaining mechanism 48 of the security drawer assembly 1.

Figure 13:
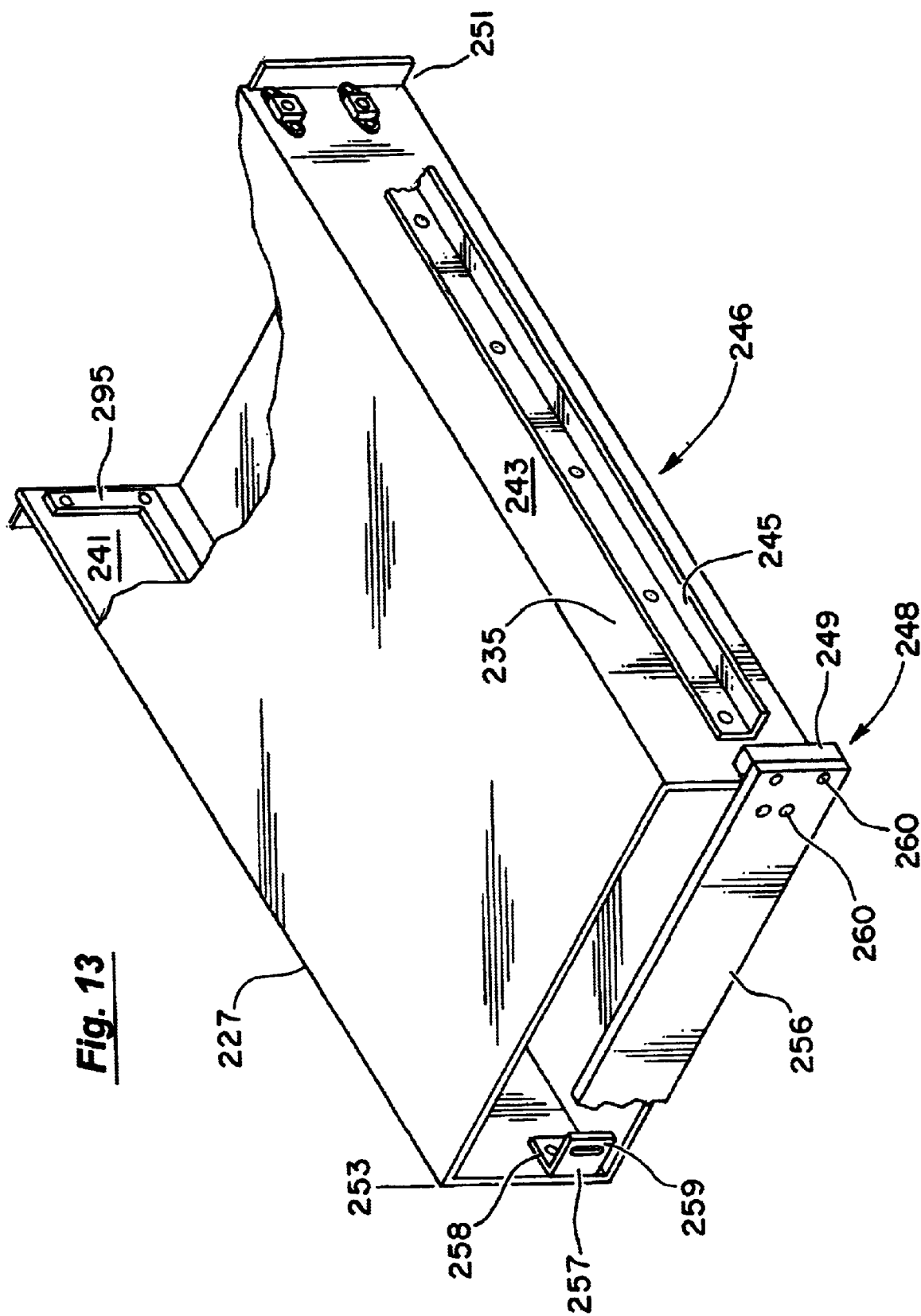
FIG. 13 is a partial perspective view of a sleeve for the security drawer assembly for the half-sized service cart.

Unlike the sleeve 27, the sleeve 227 can only be removed from the cart 203 in a single direction (toward the open end 211), as the back wall 214 prevents movement in the direction of the back end 213. For this reason, the sleeve retaining mechanism 248 (see FIG. 13) only requires a single pair of stop blocks 249 which engage the ends of the cart sidewall runners 219 proximate the back wall 214. No stop blocks 249 are required proximate the front end 211 of the cart 203.

A preferred way of mounting the stop blocks 249 is by use of a crossbar 256 and a pair of brackets 257. Each of the brackets 257 is generally L-shaped, having a first leg 258 and a second leg 259 which are oriented at right angles to each other. The first leg 258 of each of the brackets 257 is secured to the inner surface 241 of a respective one of the sleeve sidewalls 235, proximate the back end 253, in such a manner that the second leg 259 extends inwardly from the sidewall 235 and is flush with the back end 253 of the sidewall 235. The crossbar 256 is secured to the brackets 257 using screws or other appropriate fasteners 260 such that the ends of the crossbar 256 extend outward past the sleeve sidewalls 235. The stop blocks 249 are secured to the crossbar 256 outside the sleeve sidewalls 235 and proximate the ends of the crossbar 256, also using screws 260. As with the drawer assembly 1, the screws 260 which retain the sleeve 227 within the cart 203 are not accessible when the drawer 229 is closed and locked.

The drawer 229 is substantially identical to one-half of the drawer 29 described above, the dividing wall 83 of the drawer 29 becoming a back wall (not shown) of the drawer 229. The drawer 229 has sidewalls 267 and a lock mechanism 287 with a deadbolt 293 which selectively extends through one of the drawer sidewalls 267. A drawer stop 295 is secured to the inner surface 241 of the adjacent one of the sleeve sidewalls 235 to engage the deadbolt 293.

IV. Conclusion

It is to be understood that while certain forms of the present invention have been illustrated and described herein, it is not to be limited to the specific forms or arrangement of parts described and shown. For example, while the security drawer assembly has been described herein as having lock mechanisms 87, 89 connected to the drawer 29 and having deadbolts 93 engaging stops 49, 95 secured to the sleeve 27, it is foreseen that a security drawer assembly 1 within the scope of the present invention could be constructed with the lock mechanisms 87, 89 secured to the sleeve 27 and having deadbolts 93 engaging stops secured to the drawer 29.

What is claimed is:

1. A security drawer assembly for a receptacle with opposite sidewalls, which includes:

a) a sleeve with an open end and a passage open at said end, wherein said sleeve includes first and second opposite sidewalls;

b) a sleeve mounting mechanism connected to said sleeve for mounting said sleeve within the receptacle, wherein said sleeve mounting mechanism comprises:

i) first and second horizontal flanges each secured to a respective one of said sleeve opposite sidewalls, said flanges engagable with respective first and second runners on the receptacle sidewalls, the runners each having forward and rearward ends; and ii) first and second stop blocks, each of said stop blocks being secured to said sleeve, one of said stop blocks for engaging the forward end of one of the cart sidewall runners, the other of said stop blocks for engaging the rearward end of one of the cart sidewall runners, said stop blocks collectively for preventing said sleeve from being slidable relative to the receptacle;

c) a drawer movably mounted in said sleeve passage and movable between open and closed positions;

d) a lock mechanism mounted on said drawer and engageable with said sleeve such that said drawer has a locked position wherein said drawer is locked within said sleeve and an unlocked position wherein said drawer is allowed to be moved to its open position; and wherein e) said drawer in its locked position prevents access to said sleeve mounting mechanism whereby said sleeve is securable within the receptacle.

2. The security drawer assembly according to claim 1, wherein:

a) said sleeve open end is a first open end and said sleeve further comprises a second open end; and b) said drawer open position is a first open position, and said drawer is also moveable to a second open position through said sleeve second open end.

3. The security drawer assembly according to claims 2, wherein:

a) said drawer includes a bottom wall, first and second drawer sidewalls, first and second opposite end walls, and a dividing wall intermediate said first and second end walls, said dividing wall dividing said drawer into first and second compartments;

b) only said first compartment is accessible when said drawer is in said first open position; and c) only said second compartment is accessible when said drawer is in said second open position.

4. The security drawer assembly according to claim 3, wherein:

a) said first stop block is secured to said first sleeve sidewall proximate said first sleeve open end;

b) said second stop block is secured to said second sleeve sidewall proximate said second sleeve open end;

c) each of said stop blocks includes an inner portion extending into said sleeve passage;

d) said first and second sleeve sidewalls have respective first and second drawer stops secured thereto intermediate said first and second sleeve open ends, said drawer stops extending into said sleeve passage;

e) said lock mechanism is a first lock mechanism and has a first lock cylinder extending through said drawer first end wall and a deadbolt selectively extendable through said drawer first sidewall in response to the insertion of a first key into said first lock cylinder;

f) said security drawer assembly further includes a second lock mechanism having a second lock cylinder extending through said drawer second end wall and a second deadbolt selectively extendable through said drawer second sidewall in response to the insertion of a second key into said second lock cylinder;

g) said drawer is in said locked position when both of said deadbolts are extended, said first deadbolt engaging said first stop block inner portion and said second deadbolt engaging said second stop block inner portion;

h) said unlocked position is a first unlocked position, said drawer being in said first unlocked position when only said second deadbolt is extended, said second deadbolt being moveable between said second drawer stop and said second stop block inner portion such that said drawer is moveable to said first open position; and i) said drawer also has a second unlocked position, said drawer being in said second unlocked position when only said first deadbolt is extended, said first deadbolt being moveable between said first drawer stop and said first stop block inner portion such that said drawer is moveable to said second open position.

5. The security drawer assembly according to claim 3, wherein each of said first and second drawer compartments includes a plurality of bill dividers for sorting cash and a plurality of change cups for sorting change.

6. The security drawer assembly according to claim 3, wherein each of said first and second drawer compartments includes a security box, said security box having a hinged lid with a hasp, said hasp being adapted for receiving a flexible security seal.

7. A security drawer assembly for a service cart having opposite cart sidewalls, each cart sidewall having an inner surface with a horizontal runner mounted thereon, each runner having a forward end and a rearward end, the cart sidewalls defining a storage space therebetween having first and second open ends, said security drawer assembly comprising:

a) a sleeve having opposing first and second sleeve sidewalls defining a passage therebetween, said passage having an open end, each of said sleeve sidewalls having opposing outboard ends and an outer surface with a horizontal flange mounted thereon, said flanges being engagable with the cart sidewall runners;

b) a drawer slidably mounted within said sleeve passage and moveable through said sleeve passage open end between an open position and a closed position;

c) a lock mechanism connected to one of said drawer or said sleeve and having a deadbolt selectively engaging the other of said drawer or said sleeve to secure said drawer to said sleeve in said closed position; and d) first and second stop blocks, each of said stop blocks being secured to a respective one of said sleeve sidewall outboard ends by at least one fastener, said fasteners not being accessible for removal when said drawer is in said closed position, one of said stop blocks for engaging the forward end of one of the cart sidewall runners, the other of said stop blocks for engaging the rearward end of one of the cart sidewall runners, said stop blocks collectively for preventing said sleeve from being slidable relative to the service cart.

8. The security drawer assembly according to claim 7, wherein:

a) said sleeve passage open end is a first open end and said sleeve passage further includes a second open end; and b) said drawer open position is a first open position and said drawer is further moveable to a second open position through said sleeve passage second open end.

9. The security drawer assembly according to claim 8, wherein:

a) said drawer comprises a bottom wall, first and second opposing drawer sidewalls, and first and second opposing end walls;

b) said lock mechanism is a first lock mechanism connected to said drawer ad has a first lock cylinder extending through said drawer first end wall and said deadbolt is selectively extendable through said drawer first sidewall in response to the insertion of a first key into said first lock cylinder;

c) said security drawer assembly further includes a second lock mechanism connected to said drawer and having a second lock cylinder extending through said drawer second end wall and a second deadbolt selectively extendable through said drawer second sidewall in response to the insertion of a second key into said second lock cylinder;

d) each of said sleeve sidewalls has an inner surface, said first sleeve sidewall inner surface having a first drawer stop mounted thereon intermediate said opposing sidewall outboard ends, and said second sidewall inner surface having a second drawer stop mounted thereon intermediate said sidewall outboard ends;

e) said first stop block is secured to the outboard end of said first sleeve sidewall proximate said first sleeve passage open end, said second stop block is secured to the outboard end of said second sleeve sidewall proximate said second sleeve passage open end, and said stop blocks each include an inner portion which extends into said sleeve passage;

f) when both of said deadbolts are extended, said drawer is retained in said closed position, said first deadbolt engaging said first stop block inner portion and said second deadbolt engaging said second stop block inner portion;

g) when only said first deadbolt is extended, said drawer is moveable to said second open position, said first deadbolt being moveable between said first drawer stop and said first stop block inner portion; and h) when only said second deadbolt is extended, said drawer is moveable to said first open position, said second deadbolt being moveable between said second drawer stop and said second stop block inner portion.

10. The security drawer assembly according to claim 9, wherein:
   a) said drawer further includes a dividing wall intermediate said first and second end walls, said dividing wall dividing said drawer into first and second compartments;
   b) only said first compartment is accessible when said drawer is in said first open position; and
   c) only said second compartment is accessible when said drawer is in said second open position.

11. The security drawer assembly according to claim 10, wherein each of said first and second drawer compartments includes a plurality of bill dividers for sorting cash and plurality of change cups for sorting change.

12. The security drawer assembly according to claim 10, wherein each of said first and second drawer compartments includes a security box, said security box having a hinged lid with a hasp, said hasp for receiving a flexible security seal.

13. A security drawing assembly for a service cart with opposite cart sidewalls forming a storage compartment therebetween, each cart sidewall mounting a horizontal cart rail in said compartment, said service cart including first and second end openings and first and second doors hingedly mounted adjacent to the first and second end openings respectively for selectively closing said first and second doors, which security drawer includes:
   a) a sleeve with opposite first and second sleeve sidewalls, opposite first and second open ends, and a passage extending between said open ends;
   b) a sleeve rail mounted to each said sleeve sidewall and adapted for slidably engaging a respective cart rail, said sleeve being horizontally slidably supportable in said compartment by said sleeve rails engaging respective said cart rails;
   c) first and second sleeve retaining mechanisms mounted on one of said sleeve sidewalls proximate said sleeve ends and capturing a respective cart rail therebetween with said sleeve mounted in said compartment;
   d) a drawer with first and second ends slidably received in said sleeve passage and movable between a first extended position with said drawer first end extending from said sleeve first end, a second extended position with said drawer second end extending from said sleeve second end and a closed position generally within said sleeve; and
   e) first and second lock mechanisms mounted on said drawer first and second ends respectively, each said lock mechanism having a locked position wherein its respective drawer end is retained within said passage and an unlocked positioned allowing said respective drawer end to be extended from said passage.

14. The security drawer assembly according to claim 13, wherein said first and second sleeve retaining mechanisms respectively comprise first and second stop blocks each secured to said sleeve sidewall by at least one fastener, said fasteners not being accessible for removal when said drawer is in said closed position.

15. The security drawer assembly according to claim 14, and further including third and fourth stop blocks mounted on the other of said sleeve sidewalls proximate said sleeve ends and capturing a respective cart rail therebetween with said sleeve mounted in said compartment, each said stop block secured to said sleeve sidewall by at least one fastener, said fasteners not being accessible for removal when said drawer is in said closed position.

16. The security drawer assembly according to claim 15, wherein:
   a) said drawer further includes first and second drawer sidewalls;
   b) said first lock mechanism includes a first deadbolt selectively extendable through said first drawer sidewall and said second lock mechanism includes a second deadbolt selectively extendable through said second drawer sidewall, said deadbolts being extended when said lock mechanisms are in said locked position;
   c) each of said stop blocks includes an inner portion which extends into said sleeve passage;
   d) said first and second sleeve sidewalls have respective first and second drawer stops secured thereto intermediate said first and second sleeve open ends, said drawer stops extending into said sleeve passage;
   e) when both of said lock mechanisms are in said locked position, said drawer is retained in said closed position, said first deadbolt engaging the inner portion of the one of said stop blocks mounted on said first sleeve sidewall proximate said first sleeve end and said second deadbolt engaging the inner portion of the one of said stop blocks mounted on said second sleeve sidewall proximate said second sleeve end;
   f) when only said first lock mechanism is in said locked position, said first deadbolt is extended and moveable between the inner portion of the one said stop blocks mounted on said first sleeve sidewall proximate said first sleeve end and said first drawer stop, allowing said drawer to be moveable to said second extended position; and
   g) when only said second lock mechanism is in said locked position, said second deadbolt is moveable between the inner portion of the one of said stop blocks mounted on said second sleeve sidewall proximate said second sleeve end and said second drawer stop, allowing said drawer to be moveable to said first extended position.

17. The security drawer assembly according to claim 13, wherein:
   a) said drawer further includes a dividing wall intermediate said first and second ends, said dividing wall dividing said drawer into first and second compartments;
   b) only said first compartment is accessible when said drawer is in said first extended position; and
   c) only said second compartment is accessible when said drawer is in said second extended position.

18. The security drawer assembly according to claim 17, wherein each of said first and second drawer compartments includes a plurality of bill dividers for sorting cash and plurality of change cups for sorting change.

19. The security drawer assembly according to claim 17, wherein each of said first and second drawer compartments includes a security box, said security box having a hinged lid with a hasp, said hasp for receiving a flexible security seal.

* * * * *